(12) United States Patent
Hsieh

(10) Patent No.: US 6,774,293 B2
(45) Date of Patent: Aug. 10, 2004

(54) QUICK-RELEASE DEVICE FOR A MUSIC SUPPORT STAND

(76) Inventor: Wu-Hong Hsieh, No. 162, Chung Shan $2^{nd}$ Rd., Lu Chou City, Taipei Hsien (TW)

(*) Notice: Subject to any disclaimer, the term of this patent is extended or adjusted under 35 U.S.C. 154(b) by 0 days.

(21) Appl. No.: 10/342,369

(22) Filed: Jan. 15, 2003

(65) Prior Publication Data

US 2004/0134331 A1 Jul. 15, 2004

(51) Int. Cl.$^7$ .............................. G10D 3/00; G10G 5/00
(52) U.S. Cl. .......................... 84/327; 84/421; 84/422.3; 84/387 A
(58) Field of Search ....................... 84/327, 421, 422.3, 84/387 A (56) References Cited

U.S. PATENT DOCUMENTS 4,528,768 A * 7/1985 Anderson .................... 43/21.2
6,316,706 B1 * 11/2001 Sammons ..................... 84/327
6,484,977 B1 * 11/2002 Yu ........................... 248/125.1

* cited by examiner

Primary Examiner—Shih-Yung Hsieh
(74) Attorney, Agent, or Firm—Bacon & Thomas PLLC (57) ABSTRACT

A quick-release device is used for a music support stand composed of a vertical rod and a boom rod. The quick-release device consists of a body, a locking block and a lever. The body has a head, a rod socket and a locking cavity. The head is adapted to attach to the boom rod of a music support stand. The rod socket is formed under the head to receive the vertical rod. The locking cavity is formed on the rod socket and has an inner space to communicate with an inner hole in the rod socket. The locking block is movably mounted inside the locking cavity, and the lever is pivotally attached to the body to press the locking block against the vertical rod or to release the locking block. The music support stand can be quickly attached or detached in an easy way.

11 Claims, 8 Drawing Sheets

QUICK-RELEASE DEVICE FOR A MUSIC SUPPORT STAND

FIELD OF THE INVENTION

The present invention relates to a device for a music support stand, and more particularly to a quick-release device for a music support stand, which can be connected or disconnected quickly and easily.

DESCRIPTION OF THE RELATED ART

Multiple music support stands are used to hold objects for musicians, performers, speakers, etc. For example, a music stand is used to hold sheets of music score when a musician plays or a microphone stand is used to support a microphone for singers, speakers and certain musicians.

Figure 8:
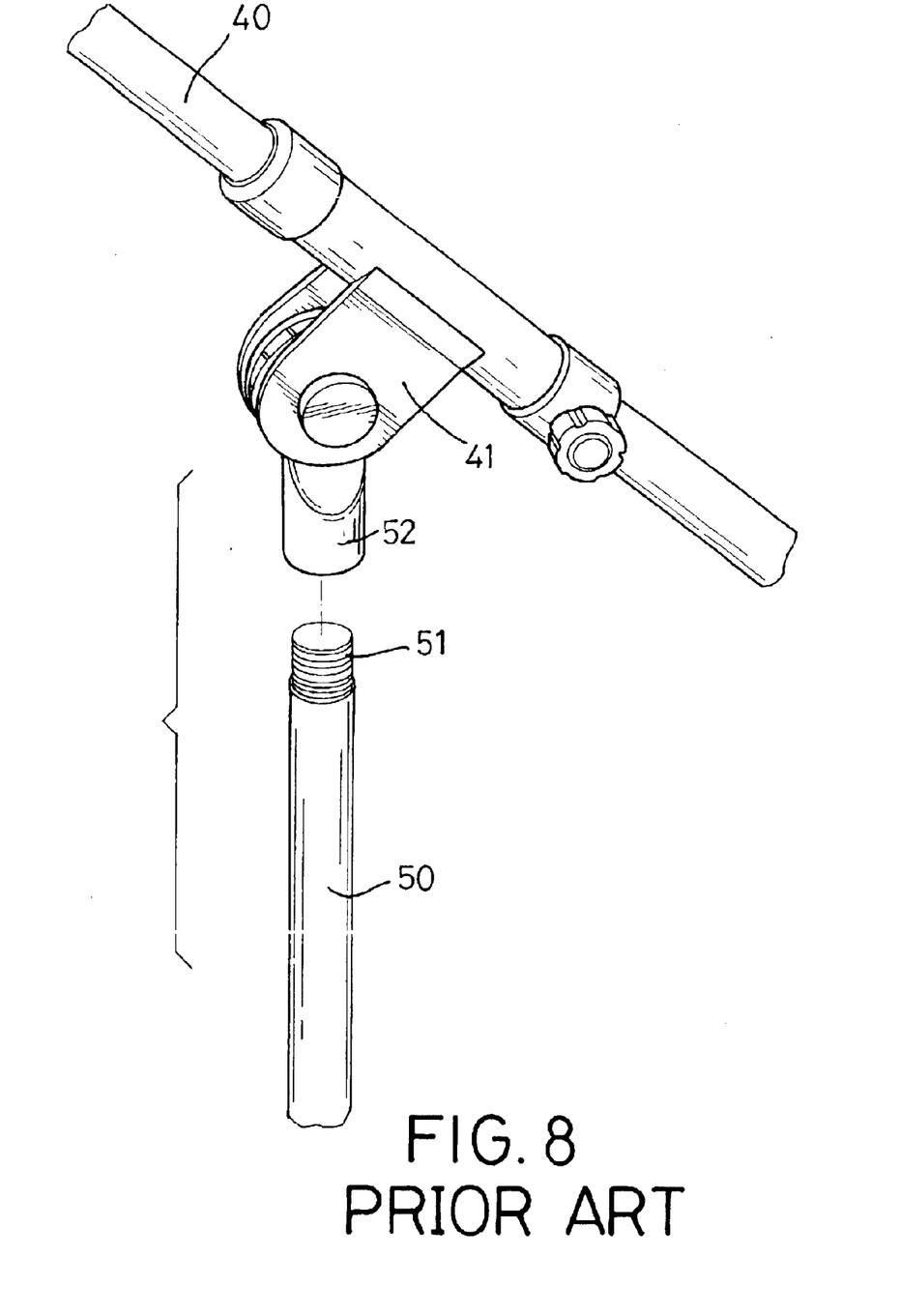
FIG. 8 is a perspective view of a conventional microphone stand.

With reference to FIG. 8, a conventional microphone stand is composed of a boom rod (40) and a vertical rod (50).

The vertical rod (50) adapts to connect to a base (not shown) and has a threaded end (51) to connect to a fitting on the boom rod (40).

The boom rod (40) is mounted at an angle on the vertical rod (50) and has a bracket (41) formed on the boom rod (40). A stub (52) is rotatably mounted in the bracket (41) and has a free end with a threaded hole (not shown) corresponding to the threaded end (51) of the vertical rod (50) to attach the boom rod (40) to the vertical rod (50).

However, the conventional supporting stand has the following drawbacks during use.

1. When the boom rod (40) attaches to the vertical rod (50), either the boom rod (40) has to be screwed onto the vertical rod (50), or the vertical rod (50) has to be screwed into the boom rod (40). However, the boom rod (40) is too long to rotate easily, and the vertical rod (50) mounted on the base is also too heavy to rotate easily. Therefore, attaching or detaching elements of the conventional music suppor stand is difficult.

2. Combining the boom rod (40) and the vertical rod (50) together by threading way is time-consuming and threads defined in the threaded end (51) of the vertical rod (50) and the threaded hole of the stub (52) are easily worn out after using for a period of time.

The present invention has arisen to mitigate or obviate the disadvantages of the conventional culturing chamber.

SUMMARY OF THE INVENTION

The main objective of the present invention is to provide a quick-release device for a music support stand, which is easily connected or disconnected.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
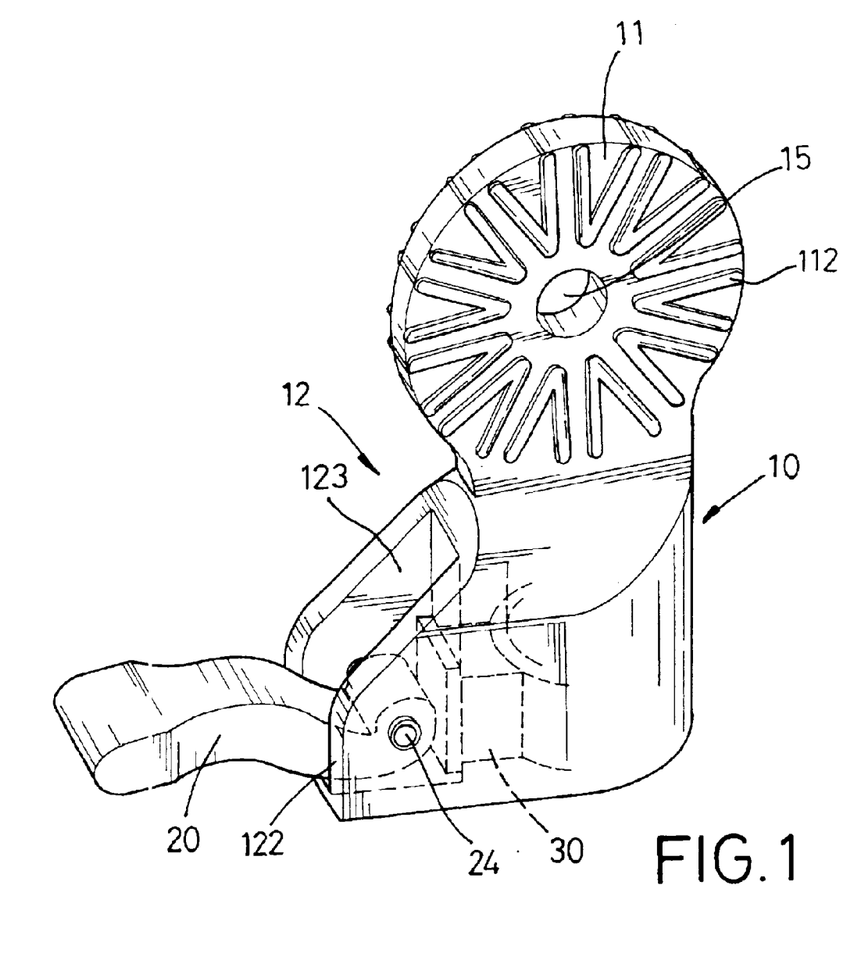
FIG. 1 is a perspective view of a quick-release device for a music support stand in accordance with the present invention.
Figure 2:
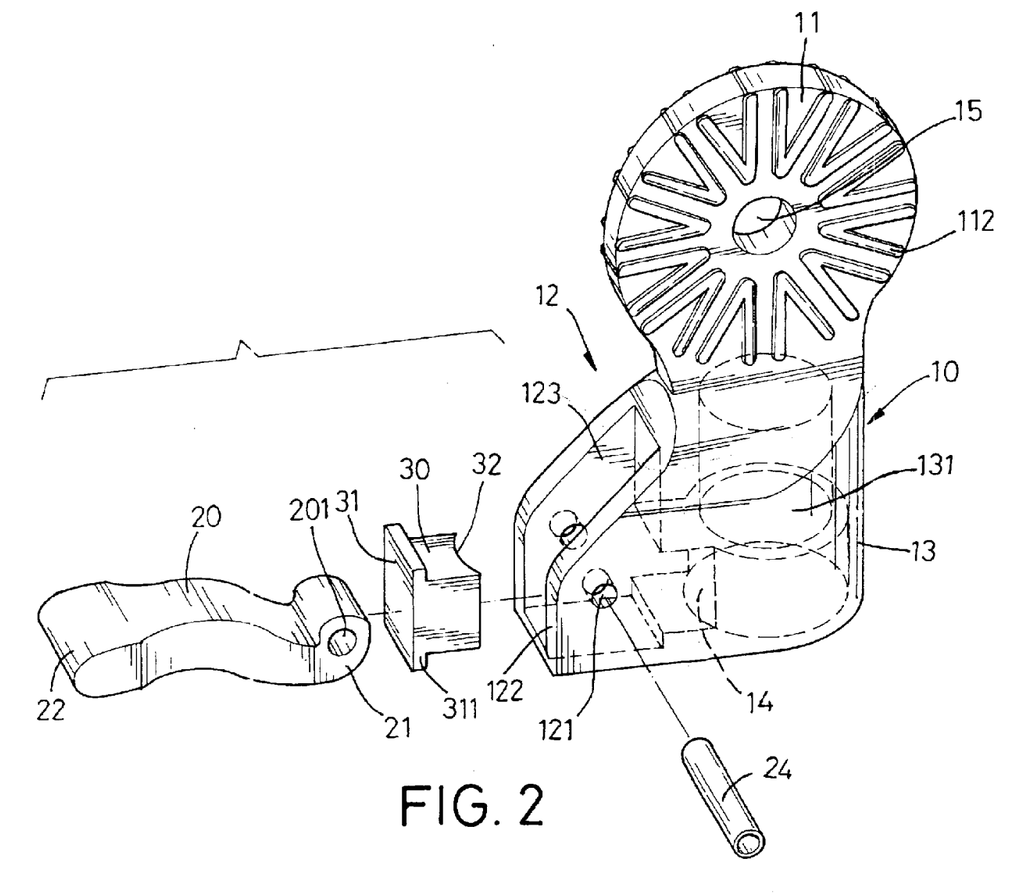
FIG. 2 is an exploded perspective view of the quick-release device for the music support stand in FIG. 1.

With reference to FIGS. 1 and 2, a quick-release device for a music support stand in accordance with the present invention comprises a body (10), a lever (20) and a locking block (30).

Figure 5:
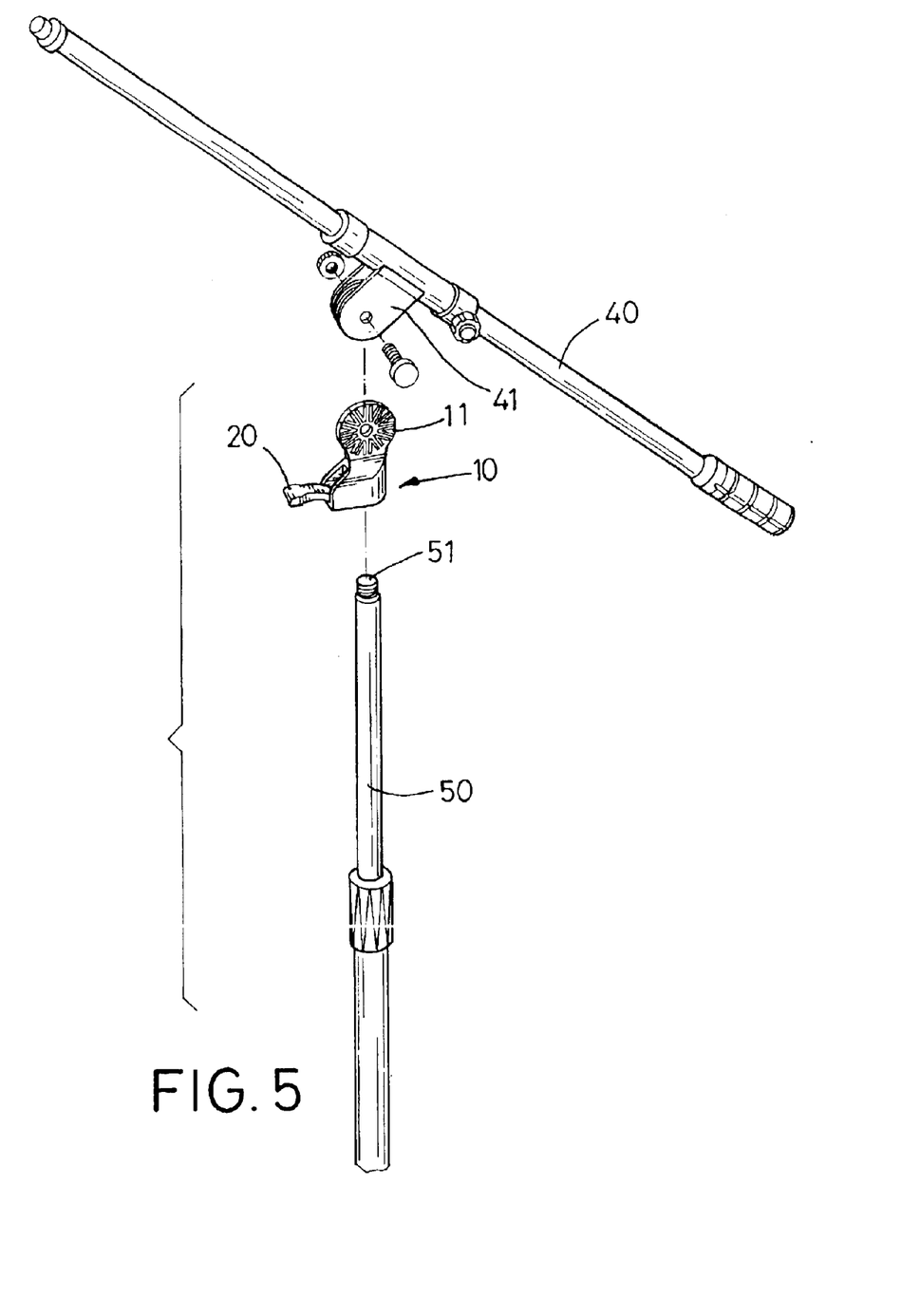
FIG. 5 is an exploded perspective view of the quick-release device in FIG. 1 used with a music support stand.

The body (10) is composed of a head (11), a rod socket (13) and a locking cavity (12). The head (11) is round and flat and has a central hole (15), two sides (not numbered) and multiple ribs (112) formed radially on the sides. With further reference to FIG. 5, the rod socket (13) has an outer periphery and a rod hole (131) and is formed under the head (11) to adapt to receive a vertical rod (50) with a curved periphery. A U-shaped locking cavity (12) is formed on the outer periphery of the rod socket (13) and has two sidewalls (122), a bottom (not numbered) and an inner space (123) defined by the sidewalls (122) and the bottom. A pivot hole (121) is defined through each sidewall (122), and the pivot holes (121) in the sidewalls (122) are aligned. The inner space (123) has a transverse channel (14) with a transverse length, which communicates with rod hole (131) of the rod socket (13). The locking block (30) and the lever (20) are mounted inside the inner space (123).

The locking block (30) has a distal end (not numbered), a proximal end (not numbered), a concave face (32), a flat head (31) and a transverse length slightly longer than the transverse length of the channel (14) and is movably mounted in the channel (14). The concave face (32) is formed on the distal end of the locking block (30) and corresponds to the curved periphery of the vertical rod (50). The flat head (31) with two lips (311) is formed on the proximal end of the locking block (30). The lips (311) prevent the locking block (30) from sliding completely into the rod hole (131) when a rod is not in the rod socket (30).

Figure 3:
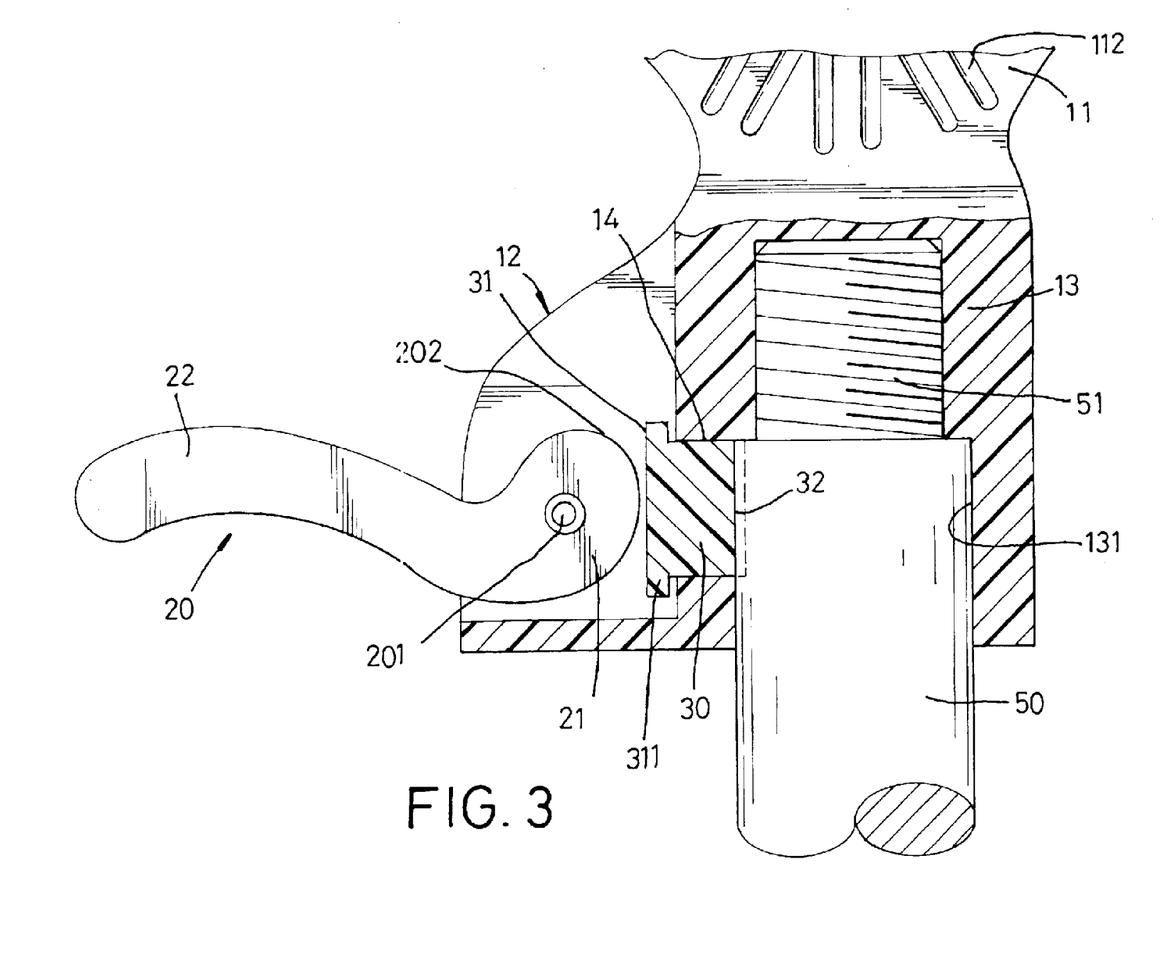
FIG. 3 is an enlarged side plan view in partial section of the quick-release device for a music support stand in FIG. 1 in a released position.

The lever (20) is a long strip with a pivot end (21) and a tab (22) and is pivotally mounted in the locking cavity (12) to press the locking block (30). With further reference to FIG. 3, the pivot end (21) has an eccentric head with a widened portion (202) and a pivot hole (201) defined through the eccentric head to align with the pivot holes (121) in the sidewalls (122). A pivot pin (24) or a rivet passes through the pivot holes (121, 201) to pivotally mount the lever (20) in the U-shaped locking cavity (12).

When the quick-release device for a music support stand is in a released position, the eccentric head (21) does not press against the flat head (31) and allows the locking block (30) to move in the channel (14) out from and to release pressure on a vertical rod (50) in the rod hole (131). Therefore, the vertical rod (50) can be easily inserted into or withdrawn from the rod hole (131).

Figure 4:
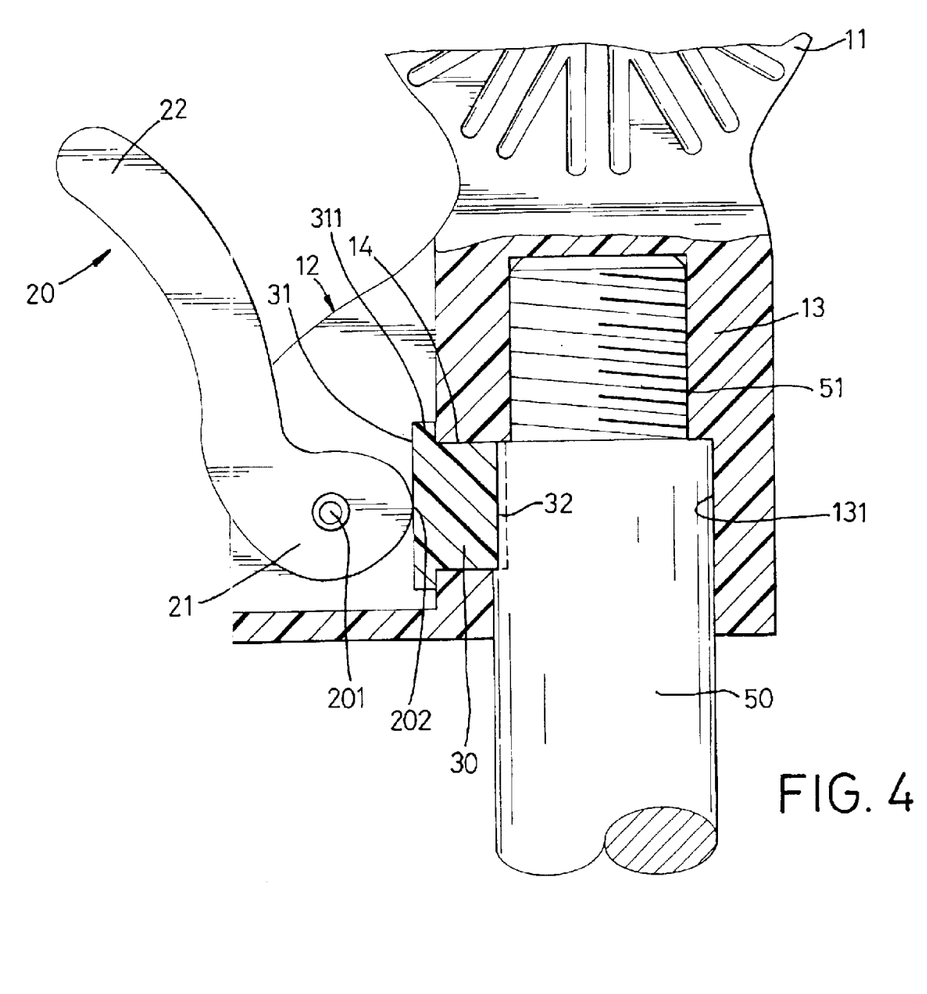
FIG. 4 is an enlarged side plan view in partial section of the quick-release device for a music support stand in FIG. 1 in a locked position.

With reference to FIG. 4, the quick-release device is locked by pushing the lever (20) upward to make the eccentric head rotate until the widened portion (202) pushes the locking block (30) against the vertical rod (50). Thereby, the vertical rod (50) is firmly held in the rod socket (13) with the quick-release device.

Figure 6:
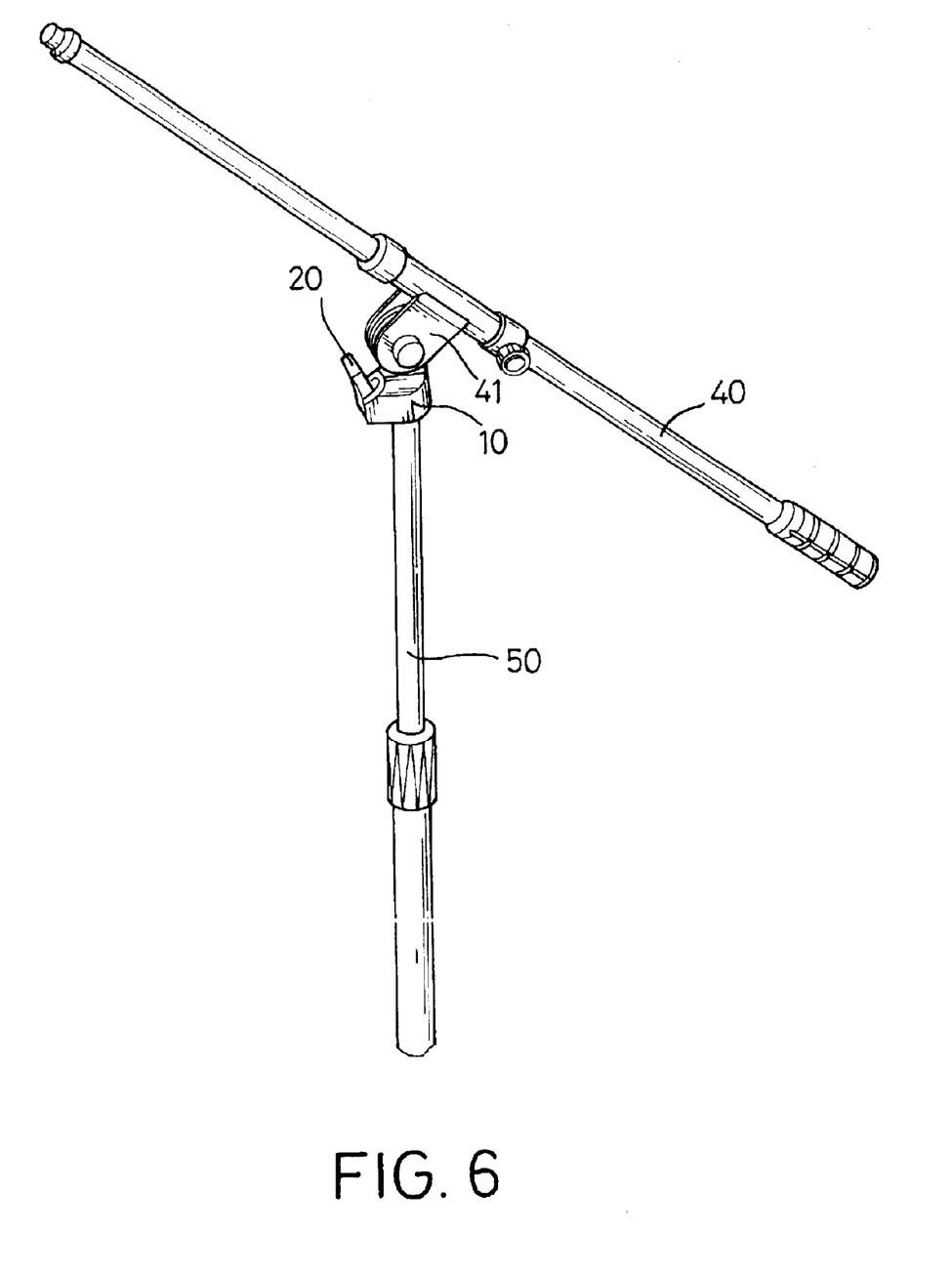
FIG. 6 is a perspective view of the quick-release device in FIG. 1 used with the music support stand in FIG. 5.

With reference to FIGS. 5 and 6, after attaching the quick-release device to the vertical rod (50), the head (11) adapts to be clamped in the bracket (41) on the boom rod (40) as described in the description of the conventional music support stand. Then, bracket and the head (11) are secured by a bolt and a nut to form the music support stand.

According to foregoing description, the music support rod can be attached quickly by attaching the quick-release device to the vertical rod (50) first and then attaching the boom rod (40) to the head (11). The lever (20) controls the releasing or locking of the locking block (30) to fasten or loosen the vertical rod (50) by pushing the tab (22). When the quick-release device is released, the vertical rod (50) can be simply withdrawn from the rod socket (30) to detach the boom rod (40). Therefore, there is no need to rotate the vertical rod (50) or the boom rod (40) for detaching.

Figure 7:
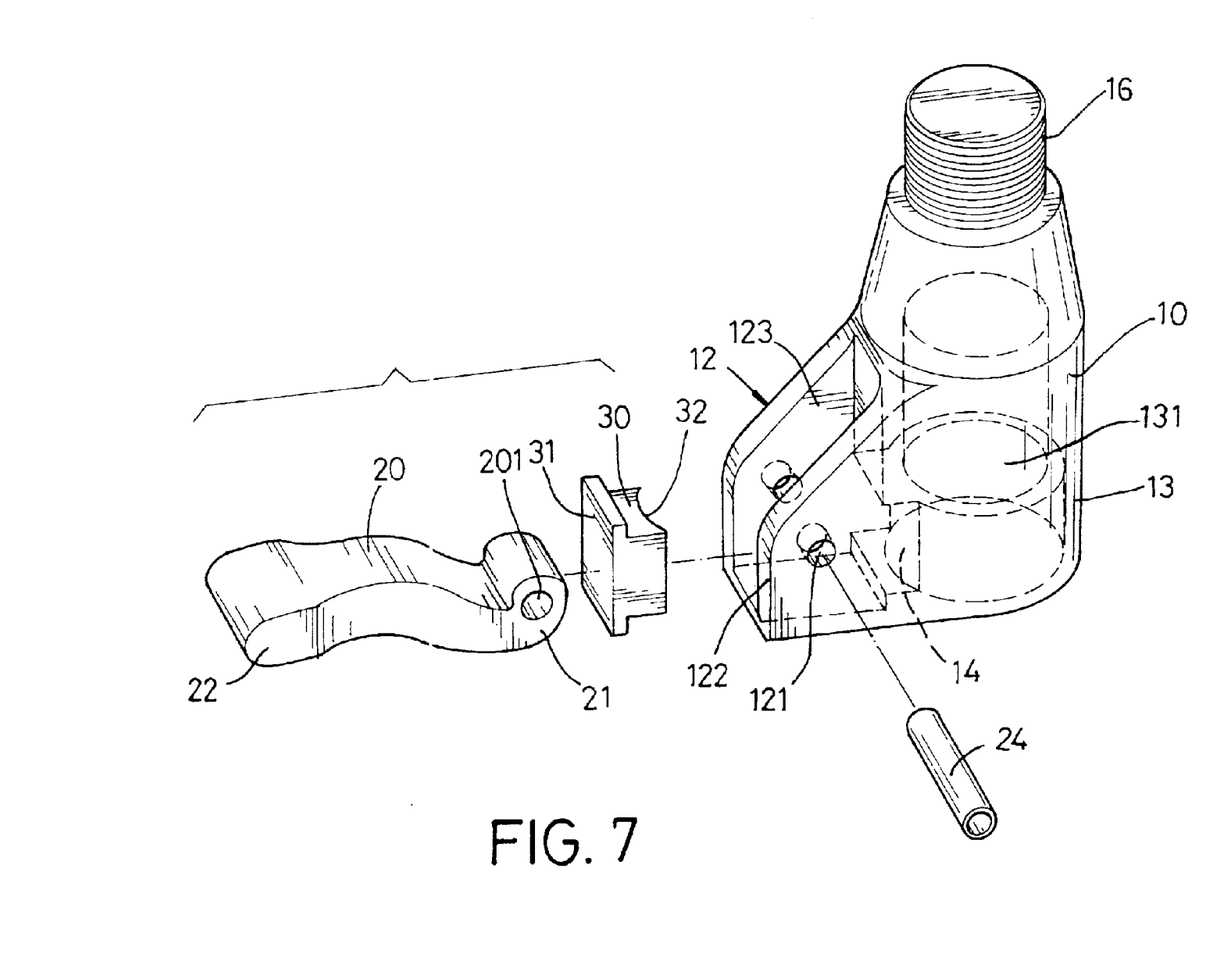
FIG. 7 is an exploded perspective view of a second embodiment of the quick-release device in accordance with the present invention.

With reference to FIG. 7, a second embodiment of the quick-release device has a threaded post (16) instead of the circular head (11) to correspond to the stub (52) with a threaded hole in the prior art. All other aspects of the second embodiment are the same as the first embodiment.

Although the invention has been explained in relation to its preferred embodiment, it is to be understood that many other possible modifications and variations can be made without departing from the spirit and scope of the invention as hereinafter claimed.

What is claimed is:

1. A quick-release device adapted to connect a vertical rod (50) to a boom rod (40) of a music support stand, the quick-release device comprising:
    a body (10) having
        a head (11) adapted to connect to the boom rod (40);
        a rod socket (13) with an outer periphery formed under the head (11) to adapt to receive the vertical rod (50); and
        a locking cavity (12) formed on the outer periphery of the rod socket (13) and having two sidewalls (122) and an inner space (123) defined ,by the sidewalls (122), wherein the inner space (123) further has a channel (14) with a transverse length communicating with a rod hole (131) in the rod socket (13);
    a locking block (30) movably mounted inside the channel (14) and having a transverse length slightly longer than the transverse length of the channel (14); and
    a lever (20) pivotally mounted inside the inner space (123) of the locking cavity (12) and having a pivot end (21) and a free end, wherein the pivot end; (21) is an eccentric head having a widened portion (202) to press against the locking block (30) to firmly attach to the vertical rod (50) when the lever (20) is pushed to a locked position.

2. The quick-release device as claimed in claim 1, wherein the locking block (30) has a proximal end, a distal end, a concave face (32) formed on the distal end to adapt to press against the vertical rod (50) and an flat head (31) and formed on the proximal end of the locking block (30).

3. The quick-release device as claimed in claim 2, wherein the lever (20) is rotatably mounted on the locking cavity (12) by a rivet.

4. The quick-release device as claimed in claim 3, wherein the head (11) is a circular plate having multiple ribs (112).

5. The quick-release device as claimed in claim 3, wherein the head is a threaded rod (16).

6. The quick-release device as claimed in claim 3, wherein two lips (311) are further formed outwardly from the flat head (31) to prevent the locking block (30) from sliding completely into the rod hole (131) of the rod socket (30) when the rod hole (131) is empty.

7. The quick-release device as claimed in claim 4, wherein two lips (311) are further formed outwardly from the flat head (31) to prevent the locking block (30) from sliding completely into the rod hole (131) of the rod socket (30) when the rod hole (131) is empty.

8. The quick-release device as claimed in claim 5, wherein two lips (311) are further formed outwardly from the flat head (31) to prevent the locking block (30) from sliding completely into the rod hole (131) of the rod socket (30) when the rod hole (131) is empty.

9. The quick-release device as claimed in claim 1, wherein the lever (20) is rotatably mounted on the locking cavity (12) by a rivet.

10. The quick-release device as claimed in claim 9, wherein the head (11) is a circular plate having multiple ribs (112).

11. The quick-release device as claimed in claim 9, wherein the head is a threaded rod (16).

* * * * *